Aug. 14, 1923.

A. G. HERRESHOFF

BODY FOR MOTOR VEHICLES

Filed Dec. 2, 1921

1,464,989

INVENTOR
Alexander Griswold Herreshoff
BY
Redding & Greeley
ATTORNEYS

Patented Aug. 14, 1923.

1,464,989

UNITED STATES PATENT OFFICE.

ALEXANDER GRISWOLD HERRESHOFF, OF NEW YORK, N. Y., ASSIGNOR TO INTERNATIONAL MOTOR COMPANY, OF NEW YORK, N. Y., A CORPORATION OF DELAWARE.

BODY FOR MOTOR VEHICLES.

Application filed December 2, 1921. Serial No. 519,309.

*To all whom it may concern:*

Be it known that I, ALEXANDER GRISWOLD HERRESHOFF, a citizen of the United States, residing in the borough of Manhattan of the City of New York, in the State of New York, have invented certain new and useful Improvements in Bodies for Motor Vehicles, of which the following is a specification, reference being had to the accompanying drawing, forming a part hereof.

This invention relates to an improved construction for a body for motor vehicles and will find its greatest commercial usefulness in jitney bus bodies. Heretofore, bodies for motor vehicles have generally been formed with longitudinal floor planks supported on a rectangular frame adapted to be set on cross sills carried by the channels of the chassis. This construction has certain disadvantages, one of which is that the body is set high giving a high step for passengers and a high center of gravity which increases the side sway and introduces an element of danger of upsetting in case of an accident. The improved body is set directly on the channels of the chassis and the invention has to do particularly with certain features of construction by which this relation is accomplished in a simple, inexpensive and thoroughly practicable manner. Further, the improved construction provides for the necessary degree of rigidity for the flooring, while permitting a necessary degree of weaving in conformity to movements of the chassis. Further, the flooring, although composed of transverse planking, is constructed in unitary form so as to permit the body to be removed from the chassis and placed thereon in accordance with former practise where independent frames are provided for the planking. To this end, beams independent of the devices for retaining the body on the chassis are placed longitudinally of the transverse planks and secured to them respectively.

A further feature of the invention has to do with the securing of the side walls of the body to the planking through reinforcing pressed steel corner members which are secured to the walls and to the planking.

The details of the invention will be described with greater particularity with reference to the illustrated embodiment of the preferred form. In the drawing—

Figure 1:
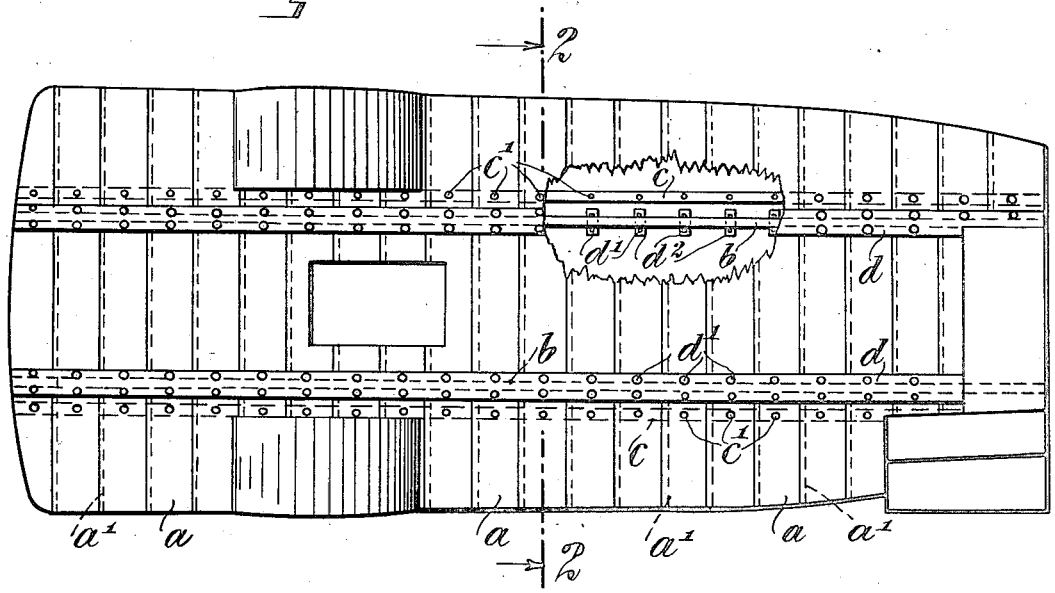
Figure 1 is a view in plan of the flooring of the improved body, the side walls being omitted in the interest of clearness and a portion of the flooring being broken out.
Figure 2:
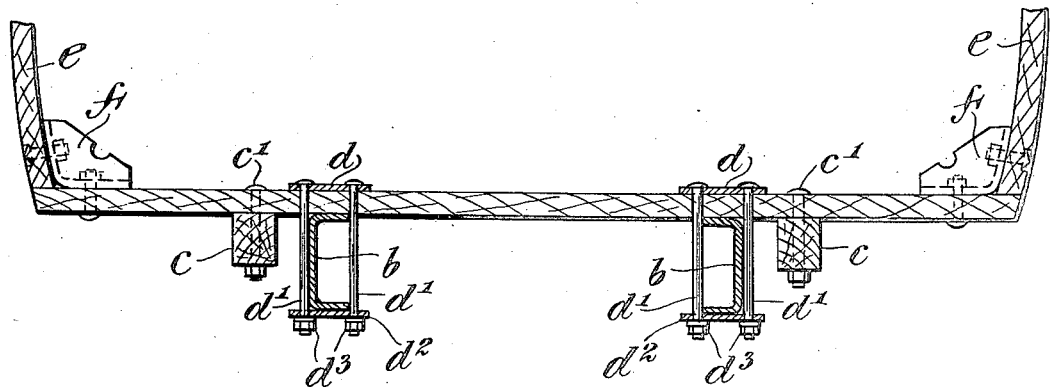
Figure 2 is a view in transverse section taken along the plane indicated by the line 2—2 of Figure 1 and looking in the direction of the arrows, a portion of the side walls being indicated in its relation to the planking.

The floor of bodies for motor vehicles have heretofore been generally constructed with longitudinal planks supported in a rectangular frame which is adapted to be set on transverse sills carried by the channels of the chassis. In the improved body, forming the subject matter of the present invention, no separate framing for the floor planks is employed, these planks *a* being comparatively short lengths extending transversely of the channels *b* of the chassis. The floor thus formed is supported directly on the channels instead of resting on interposed sills as usual. The planks *a* preferably are joined along their proximate edges by a tongue groove *a'* or other suitable joint to hold them against relative displacement. Since, in the best practise, it is necessary to provide bodies of different types which may be set on or removed from any chassis of more or less standard form, the floor for the body must be in the nature of a unitary structure, as it would hardly be practicable to assemble special planking in place on the channels of a particular chassis. Accordingly, the improved floor has its planks permanently united by means of beams *c* which extend longitudinally thereof and preferably along the underside and are bolted to the separate planks, as by means of bolts *c'*. These beams *c* will usually extend in substantial parallelism with the channels *b* and when the body is in place rest outside of the respective channels. These beams lend the necessary rigidity to the floor and yet are so united with the planks thereof that a small degree of flexibility is given in order that the floor may conform somewhat to the weaving of the frame. Having a unitary floor of this construction it is evident that the body may be placed on the chassis or removed therefrom by the means and methods commonly followed.

The retaining devices by which the floor is clamped to the channels may comprise longitudinally extending straps *d* laid over the planking and secured to the channels by means of pairs of bolts $d'$ extending, respectively, through the planks and downwardly on opposite sides of the channels and interconnected at their lower ends by stirrups $d^2$ and nuts $d^3$. These pairs of bolts will be provided for each of the retaining straps $d$ and each of the planks $a$ so that a firm union between the planks and the respective channels will be afforded.

With the unitary flooring provided as described, it becomes desirable to secure the side walls of the body thereto by devices which are secure and sightly. In the absence of a framing for the floor the side walls $e$ must be secured directly to the transverse planks $a$. Pressed steel corner pieces $f$ are bolted to the inner faces of the side walls $e$ and bolted to many or all of the planks $a$, respectively. The side walls $e$ of the body may rest directly on the planks $a$ so that the weight is carried by them and the pressed metal piece $f$ then becomes merely a retaining element to prevent displacement. As many such corner pieces as are necessary may be employed to give rigidity and security. With this type of connection it is evident that the whole body becomes of a unitary character and may be handled accordingly.

The improvements described herein are characterized by extreme simplicity but mark an important advance in the art by reason of the elimination of many features which are objectionable in bodies as usually made and by disposing the elements in the most advantageous relationship.

I claim as my invention:

1. In combination with a longitudinally extending chassis beams of a motor vehicle, a floor therefor comprising transversely extending planks resting directly on the said chassis beams, longitudinally extending straps engageable with all the planks and resting on top thereof directly over and parallel to the chassis beams, stirrups on the underside of the chassis beams and bolts in pairs engageable with the said longitudinal straps and located on opposite sides of the chassis beams and engageable with the stirrups, for detachably securing the straps and floor to said beams.

2. The combination as claimed in claim 1, in combination with a pair of longitudinally extending beams secured on the underside of the planks to bind them together in a unitary floor removable as a unit from the chassis.

This specification signed this 28th day of November, 1921.

ALEXANDER GRISWOLD HERRESHOFF.